J. F. WILLIS.
VALVE FOR WATER CLOSET TANKS.
APPLICATION FILED JULY 17, 1908.
940,295.
Patented Nov. 16, 1909.
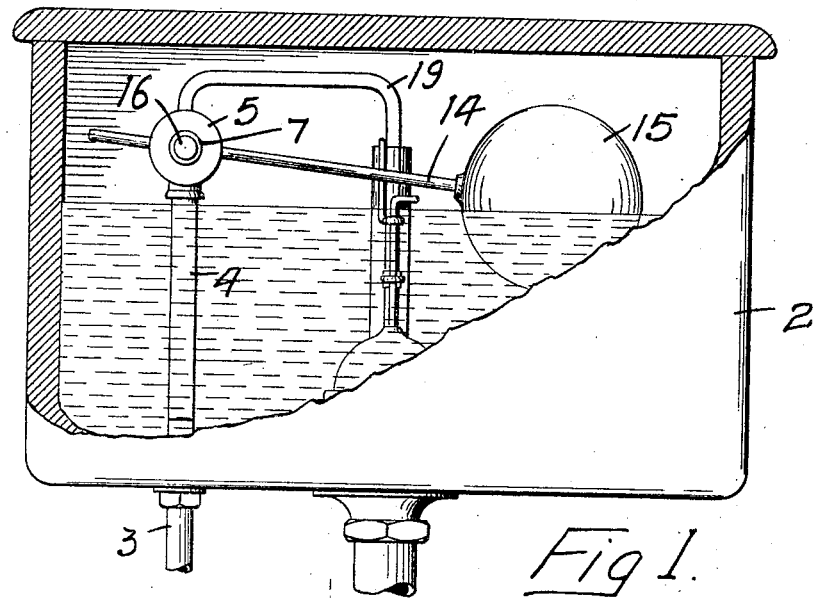
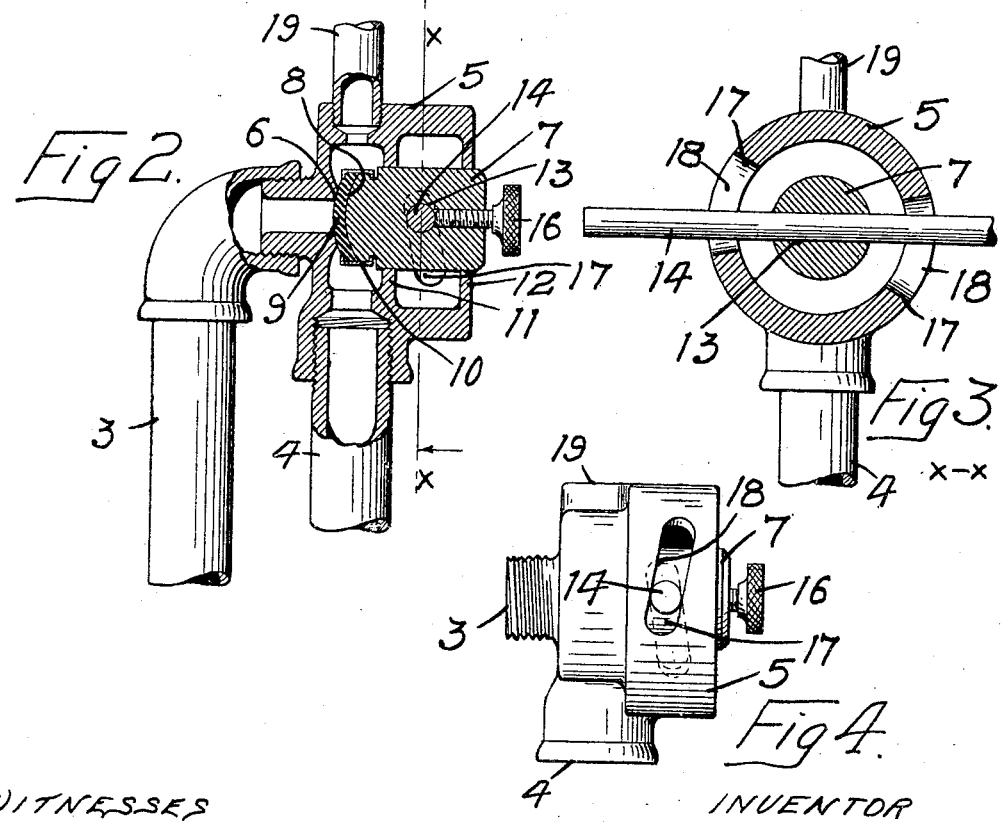
WITNESSES
INVENTOR
JOHN F. WILLIS
BY
HIS ATTORNEYS

UNITED STATES PATENT OFFICE.

JOHN F. WILLIS, OF MINNEAPOLIS, MINNESOTA.

VALVE FOR WATER-CLOSET TANKS.

940,295.

Specification of Letters Patent. Patented Nov. 16, 1909.

Application filed July 17, 1908. Serial No. 444,087.

*To all whom it may concern:*

Be it known that I, JOHN F. WILLIS, of Minneapolis, Hennepin county, Minnesota, have invented certain new and useful Improvements in Valves for Water-Closet Tanks, of which the following is a specification.

The object of my invention, is to provide a quick opening valve, controlling the entrance of water to the closet tank and a valve which will operate very easily and being of simple construction, will be comparatively inexpensive to manufacture and install in a tank.

The invention consists generally in various constructions and combinations, all as hereinafter described and particularly pointed out in the claims.

In the accompanying drawings, forming part of this specification, Figure 1, is a side elevation partially in section of a water closet tank with my invention applied thereto. Fig. 2, is a detailed sectional view illustrating the valve, and its connections, Fig. 3, is a sectional view on the line X—X of Fig. 2. Fig. 4, is a side view illustrating the casing of the valve and the means by which a reciprocating movement is imparted thereto.

In the drawing, 2 represents a water closet tank having an intake pipe 3 and discharge pipe 4 as usual in tanks of this kind.

5 is a valve casing having connections for the pipes 3 and 4 and provided with a valve seat 6.

7 is a valve having a convex disk or face 8 at one end on which I provide a facing 9 of yielding material which conforms to the surface of the disk and is secured thereon by a fastening device 10, and is adapted to seat itself on the valve seat 6 and shut off the passage of water therethrough. By providing a convex face for the valve, I expose less area to the water pressure than would be the case if the face of the valve was flat as it usually is in valves of this kind. Where a flat disk is used, the retaining ring usually projects beyond the face of the disk and in closing a contracted passage between the retaining ring and the seat is formed, causing the hissing sound which usually acompanies the closing of a water closet ballcock. By reducing the area of the valve facing exposed to the pressure, I am able to reduce the pressure on the lever 14, eliminate friction and hissing of the water when the valve closes and render the movement of the lever and the valve easier. The valve casing has walls 11 and 12 in which the valve has bearings and is capable of a reciprocating movement. A hole 13, is provided in the valve and adapted to receive a rod 14 on which a float 15 is mounted, said rod being adjustable back and forth in said valve to permit the float to be set in the desired position in the tank and said rod is locked when adjusted by means of a thumb screw 16.

The valve can be readily removed from its casing without the use of tools, by simply loosening the thumb screw 16 and withdrawing the float lever from the valve. The bearing on each side of the float lever for the valve, insures uniform movement thereof and the accurate seating of the valve at all times. The float rod projects through slots 17 in the wall of the casing on each side of the valve and these slots are diagonally arranged and have cam surface 18 on which the rod slides in the vertical movement of the float and imparts a reciprocating movement to the valve. One slot is inclined in one direction and the other in the other direction as indicated in Fig. 4, and the oscillation of the rod and its engagement with the cam surface will cause the valve to slide back and forth in its bearings and open and close the water inlet.

The valve will open and close quickly and will be more sensitive than where the screw construction is employed, the rod 14 being circular in cross section and having only a small bearing surface on the cam surfaces 18. The usual overflow pipe 19 extends from the casing 5.

I claim as my invention:

1. The combination, with a water closet tank, of a casing having an inlet opening and a valve seat inclosing said opening, a plunger valve having a face to engage said seat, a float having a rod secured to said valve, said casing having diagonally arranged slots on each side of said valve and cam surfaces formed on the edges of said slots and said rod engaging said cam surfaces and causing the reciprocation of said plunger valve when said float is moved vertically.

2. The combination, with a water closet tank, of a casing having a water inlet and valve seat therefor, and a plunger valve having a face to engage said seat, said casing having bearings for said valve, a float having a rod fitting within a socket in said plunger valve and adjustable lengthwise therein, said casing having slots in its wall on each side of said valve, said slots being oppositely inclined to the vertical and adapted to receive said float rod whereby when said float is moved vertically, said rod contacting with the edges of said slots, will impart a reciprocating movement to said valve, substantially as described.

3. The combination, of a water closet tank, of a casing having inlet, and discharge openings and pipe connections therefor, said inlet opening having a valve seat, a plunger valve mounted in said casing and arranged to engage said seat and close said inlet opening, a float having a rod mounted in said valve and means including oppositely inclined surfaces engaging said rod and imparting a reciprocating movement to said valve during the vertical movement of said float, substantially as described.

4. A ball cock, comprising a casing having inlet and discharge openings, said inlet opening having a valve seat, a valve arranged to contact with said seat and close said inlet opening, a rod having a longitudinal and rotary adjustment in said valve, a float carried by said rod, and means having inclined surfaces arranged to contact with said rod and impart a reciprocating movement to said valve when said rod is oscillated, substantially as described.

5. A ball cock, comprising a casing having inlet and discharge openings, said inlet opening having a valve seat, a valve arranged to engage said seat and close said inlet opening, a rod mounted in said valve, the wall of said casing having an obliquely arranged slot therein, through which said rod projects, said rod contacting with the inclined surface at the edge of said slot, and a float carried by said rod, substantially as described.

6. A ball cock, comprising a casing having inlet and discharge openings, said inlet opening having a valve seat, a valve having guides in said casing and adapted to engage and close said inlet opening, the walls of said casing on each side of said valve having oppositely arranged inclined slots therein, a rod mounted in said valve and projecting through said slots and contacting with the inclined edges thereof, whereby a reciprocating movement will be imparted to said valve when said rod is oscillated, and a float carried by said rod.

7. A casing having inlet and discharge openings, a valve seat within said casing, a valve therefor, said valve having a combined rotary and longitudinal movement, an operating means for said valve, said casing having oppositely inclined surfaces in the path of said means and adapted to impart movement to said valve as said means is oscillated.

8. The combination, with a water closet tank, of a casing having inlet and discharge openings and pipe connections therefor, said inlet opening having a valve seat, a valve in said casing, a rod mounted in said valve, said casing having oppositely inclined surfaces in the path of said rod and whereby the oscillation of said rod will impart a reciprocating movement to said valve, and said rod being capable of adjustment with respect to said valve to present new bearing surfaces to said inclined surfaces, and a float carried by said rod.

In witness whereof, I have hereunto set my hand this 26th day of June 1908.

JOHN F. WILLIS.

Witnesses:
C. G. HANSON,
J. A. BYINGTON.